(12) United States Patent
Tvinnereim et al.

(10) Patent No.: US 6,736,253 B2
(45) Date of Patent: May 18, 2004

(54) APPARATUSES FOR THE CONVEYING, LIFTING AND SORTING OF ARTICLES

(75) Inventors: Per Kåre Tvinnereim, Haslum (NO); Stig Finstad Evensen, Asker (NO); Øivind Jørgensen, Klokkarstua (NO)

(73) Assignee: Tomra Systems ASA, Asker (NO)

( * ) Notice: Subject to any disclaimer, the term of this patent is extended or adjusted under 35 U.S.C. 154(b) by 0 days.

(21) Appl. No.: 10/239,435

(22) PCT Filed: Mar. 30, 2001

(86) PCT No.: PCT/NO01/00138

§ 371 (c)(1),
(2), (4) Date: Nov. 26, 2002

(87) PCT Pub. No.: WO01/72614

PCT Pub. Date: Oct. 4, 2001

(65) Prior Publication Data

US 2003/0136649 A1 Jul. 24, 2003

(30) Foreign Application Priority Data

| Mar. 31, 2000 | (NO) | ............................................ 20001695 |
| Mar. 31, 2000 | (NO) | ............................................ 20001696 |
| Mar. 31, 2000 | (NO) | ............................................ 20001697 |

(51) Int. Cl.$^7$ ............................................... B65G 47/10
(52) U.S. Cl. .................................... 198/369.5; 198/598
(58) Field of Search ............................... 198/330, 531, 198/597, 598, 367.1, 368, 369.5, 370.05, 530

(56) References Cited

U.S. PATENT DOCUMENTS

| 3,598,227 | A | * | 8/1971 | Stanford ..................... 198/598 |
| 4,003,465 | A | | 1/1977 | Bauer |
| 4,147,248 | A | | 4/1979 | Kurczak et al. |
| 5,168,978 | A | * | 12/1992 | Cox et al. ................. 198/369.5 |
| 5,188,210 | A | * | 2/1993 | Malow ..................... 198/369.5 |
| 5,662,208 | A | | 9/1997 | Drewitz |

FOREIGN PATENT DOCUMENTS

| DE | 2135970 A1 | 2/1973 |
| DE | 19531432 A1 | 3/1997 |
| EP | 0384885 A2 | 8/1990 |
| EP | 0926084 A1 | 6/1999 |

OTHER PUBLICATIONS

International Search Report, filed Jul. 18, 2001.
International Preliminary Examination Report, filed Jun. 13, 2002.

* cited by examiner

*Primary Examiner*—James R. Bidwell
(74) *Attorney, Agent, or Firm*—Rodman & Rodman (57) ABSTRACT

Apparatuses for article handling, comprising one or more of a) an article-moving conveyor belt (1) designed to move along an underlying plate (55) which has a ridge portion (56), so that a substantial part of each article (21) will lie on one side or the other of the highest point of the conveyor belt; b) a lifting apparatus (4) for moving articles, e.g., PET bottles, from an in-feed point to discharge point located above the in-feed point, with the aid of a continuous row of movable article-carrying baskets (26–36) spaced apart along the length of driving belts or drive chains; and c) an article sorting apparatus (6) that is conveyed on a continuously moving conveyor belt (22) and includes a gate (15) that is designed to be able to move an article (21) away from the conveyor belt (22) sideways, and which in the neutral position of the gate (15) is designed to allow the article (21) to move past the gate (15) unaffected thereby. The actuation of the gate is controlled on the basis of a signal indicating the sorting direction sent from an article-recognition station (1).

14 Claims, 6 Drawing Sheets

APPARATUSES FOR THE CONVEYING, LIFTING AND SORTING OF ARTICLES

The present invention relates to apparatuses for the conveying, lifting and sorting of articles. Advantageously, the apparatuses can be used in a system for the handling of articles.

A first of the apparatuses according to the present invention is an article-moving conveyor belt apparatus that is designed to move along an underlying plate or the like, and where the conveyor belt consists of a flexible material, for example, rubber or plastic, and the use of an apparatus of this kind.

When conveying, for example, short round articles, where the length of the article is less than the width of the conveyor belt, there is often a tendency for such articles to lie across the belt and to roll. One of the objects of the present invention therefore is to avoid this problem, and also at the same time to ensure that the present apparatus should be capable of facilitating the conveyance of large articles such as articles whose diameter is considerably larger than the width of the conveyor belt, for example, 1.5× the width of the conveyor belt, and also rectangular articles.

According to the invention, the first apparatus is characterised in that the plate or the like has a central, longitudinal ridge portion, whereby the conveyor belt obtains a cross-section in the form of a shallow, inverted V, so that the belt has its highest point along the centre thereof, and with a gradual descent from the ridge portion towards the edge of the belt, and that along the outer edge of the belt there is provided a vertical wall portion, at least along parts of the length of the belt.

Additional embodiments of the first apparatus are apparent from the following description and also from attached, related patent claims.

The use of a conveyor-belt related apparatus of this kind has the result that a substantial part of each article conveyed lies on one side or the other of the highest point of the conveyor belt. The central location of the said ridge portion means that the sorting of articles on the conveyor belt, either to one side or the other side thereof, is made possible in a simple manner, and completely independent of whether the article is lying essentially on one side or the other of the highest, longitudinal part of the conveyor belt.

A second of the apparatuses according to the present invention is an apparatus for lifting articles, as for instance PET bottles, from an in-feed point to a discharge point located above the in-feed point, by means of a continuous row of article-supporting members.

In connection with vertical conveyance of beverage packaging, as for instance bottles or cans, where it is not only difficult to transport the packaging vertically downwards, but in addition also ensure a lifting of such beverage packaging, for example, PET bottles, there has long been a need to find a simple solution that is reliable as well.

A lifting device of this kind will be especially useful where there is a need not only for sorting along a horizontal conveying line on one level, but also sorting on levels located thereabove.

According to the invention, the second apparatus is characterised in that there is provided a first and a second conveyor belt or chain that are driven synchronously via driving guides, for example, driving wheels or drive pulleys, and moved over guides at the end of the belt or chain paths, that the belts or chains have a first vertical portion and a second portion that forms an angle with the horizontal, and that the belts or chains at the point of the transition between the said first and second portions are passed over redirecting mechanisms, that a plurality of article-carrying baskets spaced apart along the length of the belts or chains are fixedly secured to a respective part thereof, and that the baskets having passed the said redirecting mechanisms are designed to be passed along an inclined slide plate towards the discharge opening, wherein the baskets on passing the redirecting mechanisms are designed to be tipped into a position so that the basket-carried article is thus removed from the basket and is pushed by the basket along the slide plate towards the discharge opening.

Additional embodiments of the second apparatus are apparent from the following description and from the attached, related patent claims.

A third of the apparatuses according to the present invention is an apparatus for sorting articles that are conveyed on a conveyor belt, where the apparatus includes at least one actuator-controlled channel-formed gate pivotable about a vertical axis at an end thereof, said gate arranged to be able to guide an article sideways relative to the longitudinal direction of the conveyor belt by means of a rotational movement across the conveyor belt, and which in a neutral position is designed to allow the article to move past unaffected by the gate, and where the actuation of the gate is controlled on the basis of a signal indicating sorting direction sent from an article-recognition station.

A number of devices of the type mentioned above are previously known, where arms move in across the conveyor belt to move an article away from the conveyor belt in a particular direction. However, sideways sorting to both sides at one and the same point along the path of the conveyor belt is beset by major problems, especially when the conveyor belt moves continuously. One of the major tasks to be performed by the present application is to ensure a rapid sorting of articles that flow regularly out of the article-recognition station.

According to the invention, the third apparatus is characterised in that the gate has two side walls separated by a distance approximately equal to the width of the conveyor belt, and where the side walls are connected to one another at the top via at least one connecting piece; that the actuator is placed at a level above the gate and is connected via its vertical shaft to the connecting piece at the downstream end of the gate; and that the actuator is designed, based on said signal, to either hold the gate in a neutral position so that articles can pass unobstructed through the channel with its walls parallel to the direction of transport, or turn the gate to one side or the other of the conveyor belt, so that the upstream end of the gate lies essentially beyond a longitudinal edge of the conveyor belt, and so that an article to be removed from the conveyor belt through said sideways guidance is movable along an outside face of one of the channel walls having its upstream end closest to said longitudinal edge.

Further embodiments of the third apparatus are apparent from the following description and the attached, related patent claims.

The invention will now be described in more detail with reference to the attached drawings.

FIGS. 1, 2 and 3 show a system in which the apparatuses according to the invention are included, where

Figure 1:
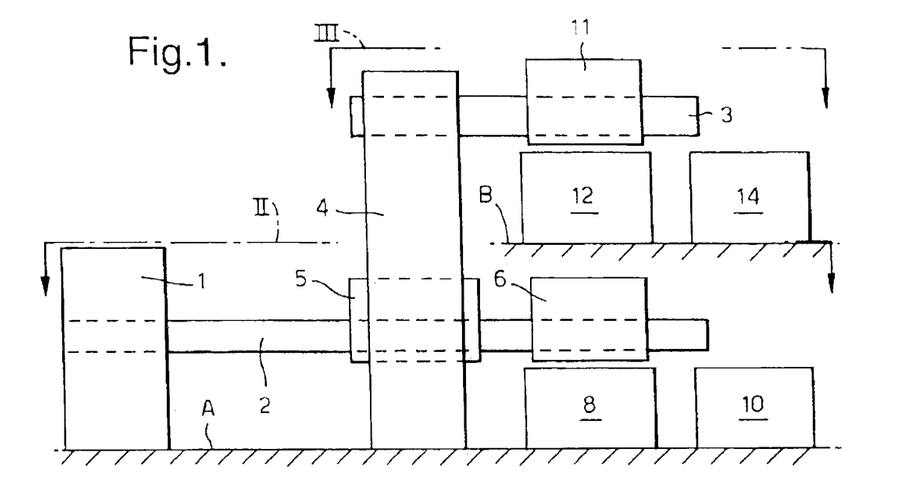
FIG. 1 is a side view of the system in block diagram form.
Figure 2:
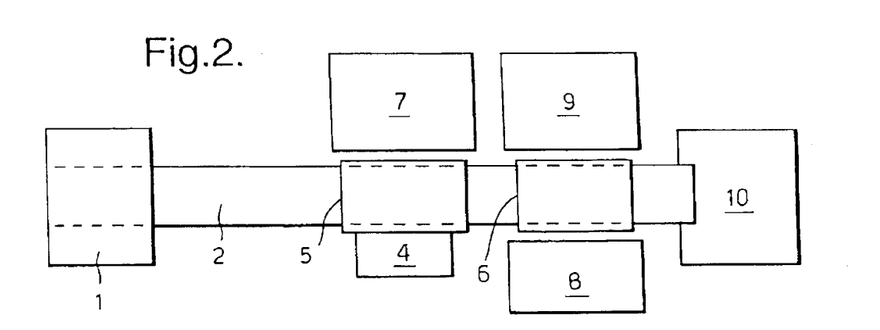
FIG. 2 is a plan view of the part of the system indicated by II and FIG. 3 is a plan view of the part of the system indicated by III.
Figure 3:
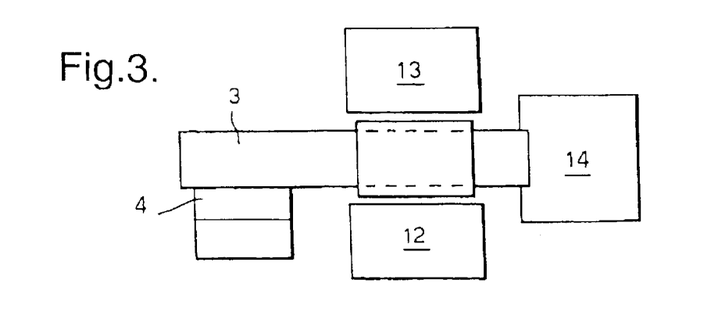

The system shown in FIGS. 1–3 consists of an article-recognition station 1, a conveyor 2 and another conveyor 3 situated at a higher level. To be able to move articles from the level represented by the conveyor 2 to the level represented by the conveyor 3, a lifting apparatus 4 is provided. Sorting apparatuses 5, 6 are provided in connection with the first conveyor belt 2. The article-sorting apparatus 5 can advantageously serve either the lifting apparatus 4 or a receptacle 7, or optionally be arranged so that articles pass the sorting apparatus 5 and move on to the downstream sorting apparatus 6, which in the given example can sort articles either to a container 8 or to a container 9. If sorting to container 8 or 9 is not to be effected, the articles can be passed through the sorting apparatus 6 and moved on by means of the conveyor's two conveyor belts to a receptacle 10 located at the end of the conveyor 2.

As a result of sorting in the sorting apparatus 5, so that an article is lifted vertically by the apparatus 4, the article will be moved up to the level of the conveyor 3. The article can then be passed to a sorting apparatus 11 of the same type per se as that shown in connection with the sorting apparatuses 5 and 6, where articles to be sorted are passed either to receptacle 12 or to receptacle 13, and the articles that are not to be sorted by the sorter 11 pass through the sorter 11 with the aid of the conveyor's 3 conveyor belts to a receptacle 14 that is located at the end of the conveyor 3. It will be noted that the containers 7–10 are placed on a first reference level A, whilst the containers 12–14 are placed on a second reference level B that is at a distance above reference level A. The sorting apparatuses 5, 6 are shown in more detail in FIG. 5. The sorting apparatus 11 is of the same type as the sorting apparatuses 5, 6. Here, it will be appreciated that more or fewer of the sorting apparatuses 5, 6 and 11 can be provided than shown by way of example in FIGS. 1–4. The sorting apparatus includes at least one gate 15 that is controlled by an actuator 16 (see FIG. 8). The actuator may be, for example, a step motor or be solenoid-driven, i.e., contain a mechanism capable of causing to-and-fro motion. Optionally, the actuator may be a DC motor 17. In that case, the reference numeral 16 represents a gear with optional V-drive transmission. Actuators of the said types are devices that are known per se.

As shown in FIGS. 5, 6, 7 and 9, the gate is made in the form of an inverted channel having two side walls 15', 15" that are separated by a distance approximately equal to the width of the conveyor belt 2' on the conveyor 2. The side walls 15', 15" are connected at the top via at least one connecting piece 15'''.

Actuation of the gate is effected by a signal indicating sorting direction and that is sent from the article-recognition station 1.

The actuator 16 is connected via a shaft 18 to said connecting piece 15''' at the downstream end of the gate 15.

A fastener 19 forms the connection between said shaft 18 and said connecting piece 15'''.

Figure 6:
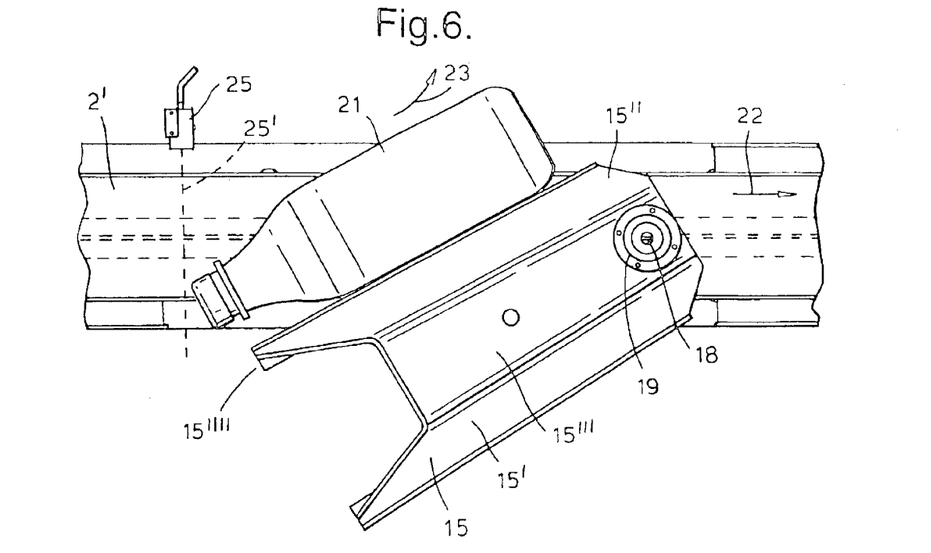
FIGS. 6, 7 and 9 show the sorting apparatus in three typical working positions.
Figure 7:
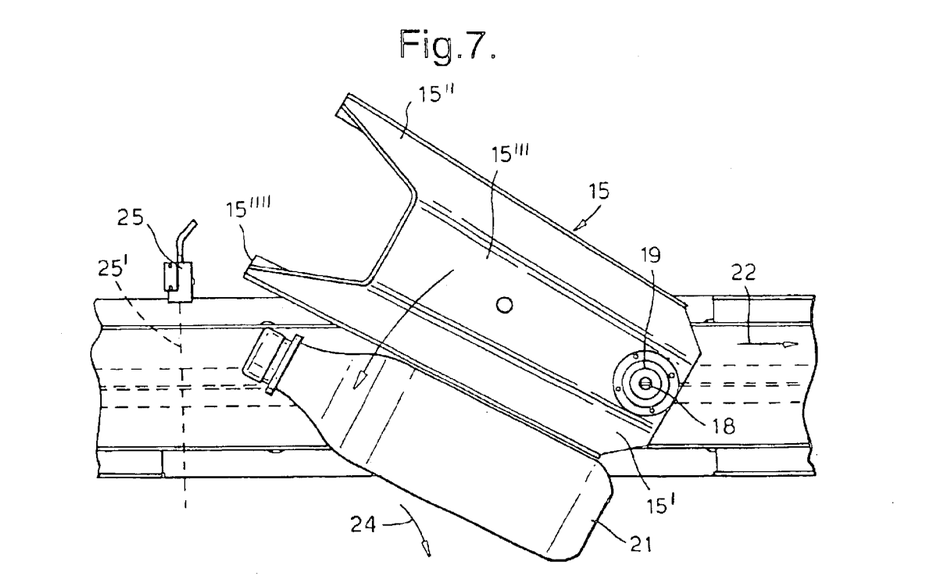
Figure 8:
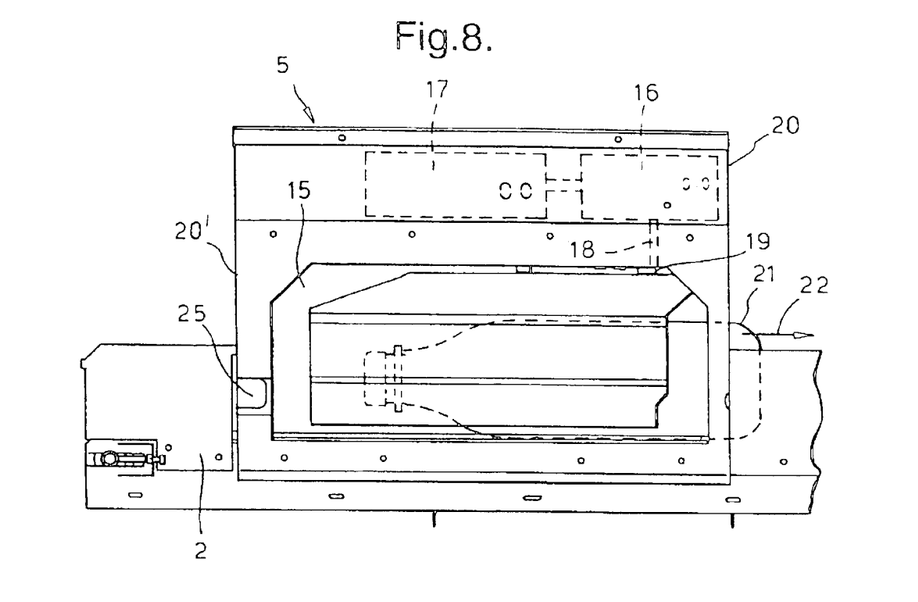
FIG. 8 shows a sorting apparatus as shown in FIG. 5, seen from the side.
Figure 9:
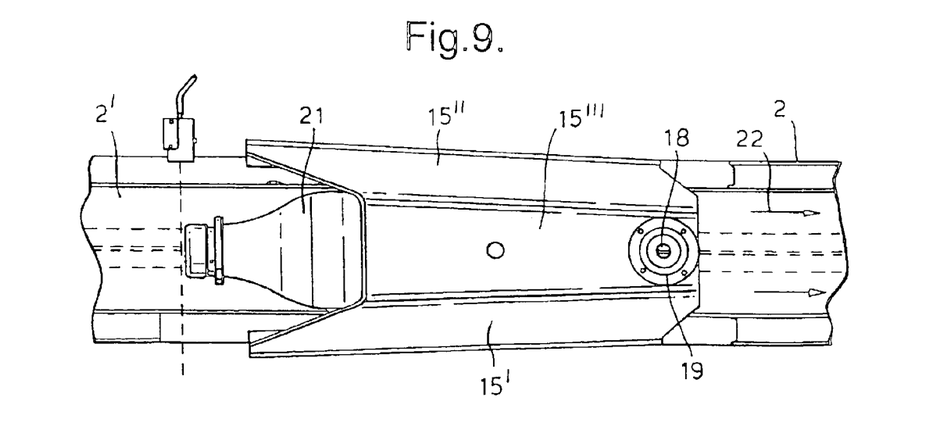

As shown in FIG. 8, the actuator 16, optionally 16, 17 is placed in a gate housing 20. As shown in FIG. 9, the gate 15 can, in response to a signal received by the actuator, take up a neutral position, so that articles 21, as for instance a bottle, can pass unobstructed through the channel with its walls 15', 15" substantially parallel to the direction of belt travel, where the direction of belt travel is indicated by the arrows 22. As shown in FIGS. 6 and 7, the gate 15 can be turned by the actuator 16 to one side or the other of the conveyor belt 2', so that the upstream end of the gate comes to rest substantially beyond a longitudinal edge of the conveyor belt 2', whereby the article 21, as for example a bottle, will be removed from the conveyor belt in that it moves along the outside of one or other of the channel walls, such as channel wall 15" in connection with the exemplary embodiment in FIG. 6, or the channel wall 15' in connection with the exemplary embodiment in FIG. 7. The removal direction of the article 21 is indicated in FIG. 6 by the arrow 23, and in FIG. 7 by the arrow 24. By turning the gate back to the neutral position, as shown in FIG. 9, or optionally to the opposite swivelled position, for example, from the position shown in FIG. 6 to the position shown in FIG. 7, the gate, with the channel wall that is closest to the article 21, will in addition push the article 21 away from the conveyor belt, whereby a rapid sorting is achieved, thus making it unnecessary to wait until the article has moved because of the movement of the conveyor belt 2' so far along the gate wall that it falls off the conveyor. To be able to determine when the gate 15 should return to the neutral position, a detector 25 can be provided at the upstream end of the gate 15. The detector 25 will detect the passing of the article 21 and can, for example, be a detector based on the use of light, ultrasound or metal detection, although this should not be understood as defining the limits of the invention. The gate 15 is preferably, but not necessarily, pivotally arranged relative to a gate housing 20. In this case, the detector 25 can advantageously be placed at the upstream end 20' of the gate housing. However, it is perfectly possible to arrange, for example, the actuator 16 in a gateway above the downstream end of the gate 15, so that the detector 25 remains a separate unit. In the instant that the article 21 enters the detection zone 25' of the detector, the gate 15 will move or not move depending on the sorting direction. The movement of the gate 15 happens quickly, the actuator being a fast-action actuator. As soon as the article 21 has passed the detection zone 25, the gate will normally return to its neutral position, as shown in FIG. 9, or optionally maintain the neutral position if the neutral position was in fact the preceding sorting position.

The conveyor belt 2' is advantageously designed to be capable of moving continuously and the articles 21 normally have a separation on the conveyor belt 2' that is a function of the return time of the gate to its neutral position (FIG. 9) after the article has passed the light detector and the time it takes the gate to turn outwards.

In the drawings in FIGS. 6–9 the article is preferably in the form of a beverage packaging, for example, a bottle or can in a horizontal position. However, the present apparatus is, of course, also usable with any type of article which can be conveniently conveyed and discharged.

The invention will now be described in more detail in connection with FIGS. 10 and 11 which show the lifting apparatus as indicated by the reference numeral 4 in FIGS. 1 and 2. The apparatus is especially suitable for lifting articles such as PET bottles, but can of course also be used for lifting other types of articles. In the chosen example, the in-feed point for the articles is represented by the exit from the sorting apparatus 5, where the articles, such as bottles, can be passed from an in-feed point, represented here by the sorting apparatus 5, to a discharge point located above the above the in-feed point, and represented schematically here by the conveyor 3.

Figures 10, 11:
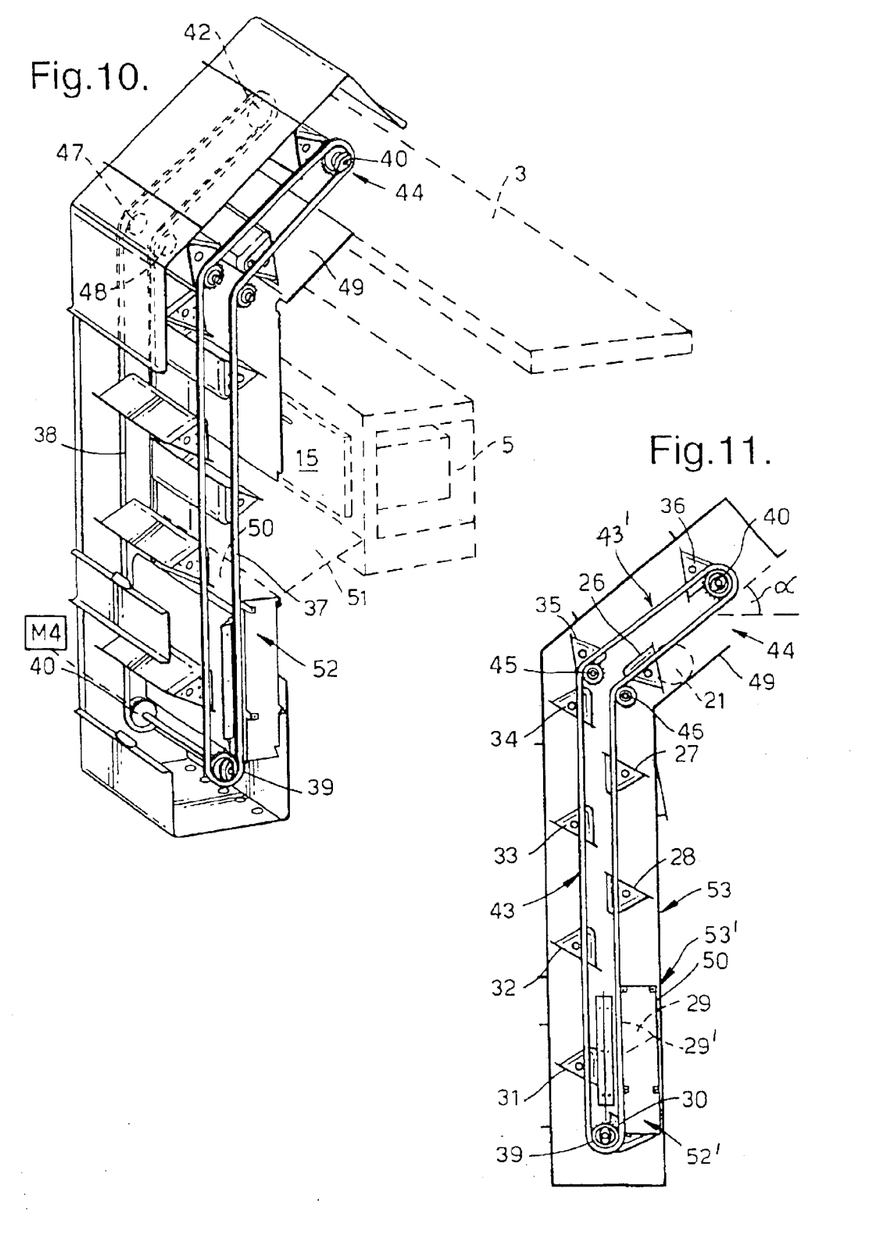
FIGS. 10 and 11 are respectively a perspective view and a side view of an article-lifting apparatus, and where the apparatus is a component of the system shown here in connection with FIGS. 1–4.

The solution that can be seen in FIGS. 10 and 11 includes plurality of article-supporting members 26–36. A first and second conveyor chain 37, 38 are provided, which are driven synchronously via toothed wheels 39, 40 and 41, 42 at the respective ends of the chain paths 37, 38. The conveyor chains 37, 38 have a first vertical portion, as indicated by the reference numeral 43 in FIG. 11, and a second portion, as indicated by the reference numeral 43', which forms an angle a with the horizontal. At the point of transition between said first and second portions 43, 43' there are redirecting wheels over which the conveyor 37,38 chains pass, and in FIGS. 10 and 11 these redirecting wheels are respectively indicated by the reference numerals 45, 46; 47, 48. The article-carrying baskets 26–36 , as shown in the example in FIGS. 10 and 11 are spaced apart along the length of the conveyor chain and are fixedly secured to a respective chain element. This in turn means that when the chain turns at, for example, the redirecting wheel 46, a respective article-carrying basket will also change direction. After the baskets 26–36 in turn have passed respective redirecting wheels 46, 48, the basket-in question will be passed along an inclined slide plate 49 towards the discharge opening 44, the basket on passing the redirecting wheels 46, 48 will be tipped into a position such that a basket-carried article, such as the article 21, is thereby removed from the basket and in reality is pushed by the basket along the slide plate towards the discharge opening 44.

As an alternative to the said redirecting wheels, it is possible to use guides such as sliding guides. Furthermore, the toothed wheels 39–42 may optionally be replaced by pulleys or the like, and in such as case the chains 37, 38 can, for example, be replaced by belts or the like.

As previously mentioned, the second portion and the said slide plate form an angle relative to the horizontal, and this angle can preferably be in the range of 10°–60°, preferably 20°–45°.

In an area of the vertical upward movement of the baskets, an edge, such as the edge 29' of the basket 29 will be a short distance from a sliding wall 50.

After the article has been sorted out from the sorter 5, it will preferably be passed down into an article-collecting shaft 52 provided beneath the in-feed area and of which said sliding wall 50 forms a part. The shaft has an open bottom area so that the baskets can in turn move therethrough.

To enable an article, as for instance a bottle or can, to pass down into the shaft whilst the chains 37, 38 each move a distance equal to the space between two neighbouring baskets, the distance between the lower edge 53' of the in-feed opening 53 and a basket located thereabove, such as the basket 28 in FIG. 11, should be at least equal to the diameter of the largest of the objects that are to be lifted.

To ensure that an article that passes the in-feed opening 53 will always be caught by a basket, the space between the baskets 26–36 must always be such that a new basket comes into position to close the bottom area 52' of the shaft when the distance between the lower edge 53' of the in-feed opening and a basket, such as basket 28, located thereabove is equal to or greater than the diameter of the smallest objects to be lifted.

A major advantage of the lifting apparatus that is illustrated and described here is that the chains and the baskets will be able to move continuously, which assures good, stable operation.

A further aspect of the present invention is related to the conveyors 2, 3 and the associated article-moving conveyor belt apparatus. It is essential to be able to convey not only large articles having a diameter that is, for example, equal to 1.5× the width of the conveyor belt, but also rectangular articles, and not least short, round articles whose length is less than the width of the conveyor belt. However, such short, round articles often tend to lie transverse to the direction of travel of the belt and to lie and roll on the belt, which can render the handling of such articles difficult.

Figure 12:
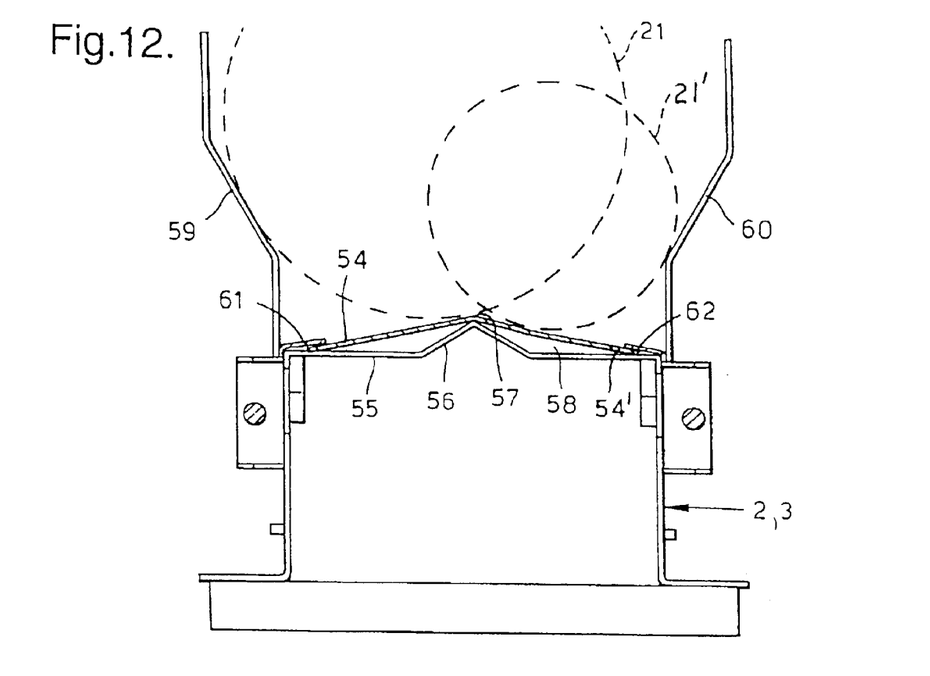
FIGS. 12 and 13 are respectively an end view and a perspective view of an article-moving conveyor belt apparatus that is a component of the system shown in general in FIGS. 1–3.

In the solution shown in FIG. 12, the conveyor belt 54 is preferably made of a flexible material, for example, rubber or plastic, and where the flexible material preferably has some form of reinforcement to increase the tear resistance of the belt. A conveyor belt 54 of this kind should be suitable for conveyance along an underlying plate or the like. According to the prior art, it is usual at points along the length of such a plate to provide bosses along which the conveyor belt slides. The purpose of these bosses is primarily to reduce the friction that otherwise would have arisen had the conveyor belt slid along the whole surface of the plate, and in addition to prevent any accumulations of dust and dirt between the plate and the belt from having a detrimental effect on the operation of a conveyor belt of this type that is an integral part of a conveyor.

Figure 13:
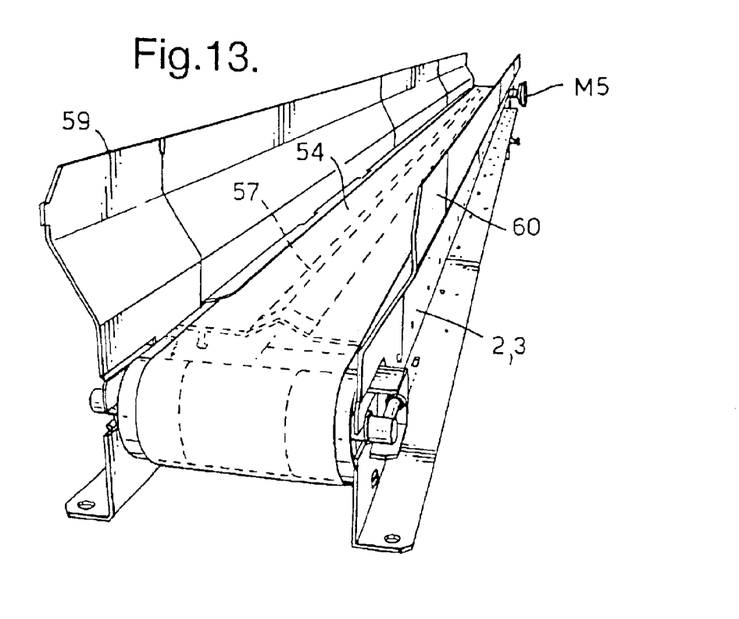

The conveyor with its conveyor belt 54 is advantageously driven by an electromotor M5, as shown in FIG. 13. Alternative positions of a motor of this kind, for example, inside a redirecting roller at one end of the conveyor is also conceivable. To assure a handling of both small and large articles, as indicated above, it is proposed according to the invention that the plate, in FIGS. 12 and 13 denoted by the reference numeral 55, has a central, longitudinal ridge portion 56, whereby the conveyor belt along the plate or the like has a cross-sectional form of a shallow, inverted V, so that the belt has its highest point along the middle 57 thereof and where there is a gradual decrease in the distance of the space 58 between the conveyor belt 54 and the plate 55 from said ridge portion 57 to the edge 54' of the belt. The said plate 55 may have said ridge portion 56 in the form of an inverted V or U.

Along the outer edge of the belt 54 a vertical wall portion 59, 60 is advantageously provided at least along parts of the length of the conveyor belt 54.

A fold 61, 62 which lies partly over said edge portion 54' of the conveyor belt is provided along the longitudinal edges of the plate. The solution outlined here has the effect that a major part of each article that is conveyed remains on one side or the other of the highest point 57 of the conveyor belt. In FIG. 12 it is shown how it is possible to envisage articles, such as bottles 21 or cans 21' in horizontal position, which can be conveyed by one and the same type of conveyor device. It is obvious that even if, for example, the bottle 21 has a diameter greater than the width of the conveyor belt, such a bottle, during its movement by the conveyor, will still rest against the vertical wall portion 59, whilst, for example, the can 21' will rest against the wall portion 60. In connection with sorting articles such as bottles and cans, the use of a sorting device as shown and described in connection with FIGS. 5–9 will not present any difficulties inasmuch as the article lying on one side or the other of the highest point of the conveyor belt 57 will in any case be easily conveyable by the conveyor belt when sorting is desirable.

Figure 4:
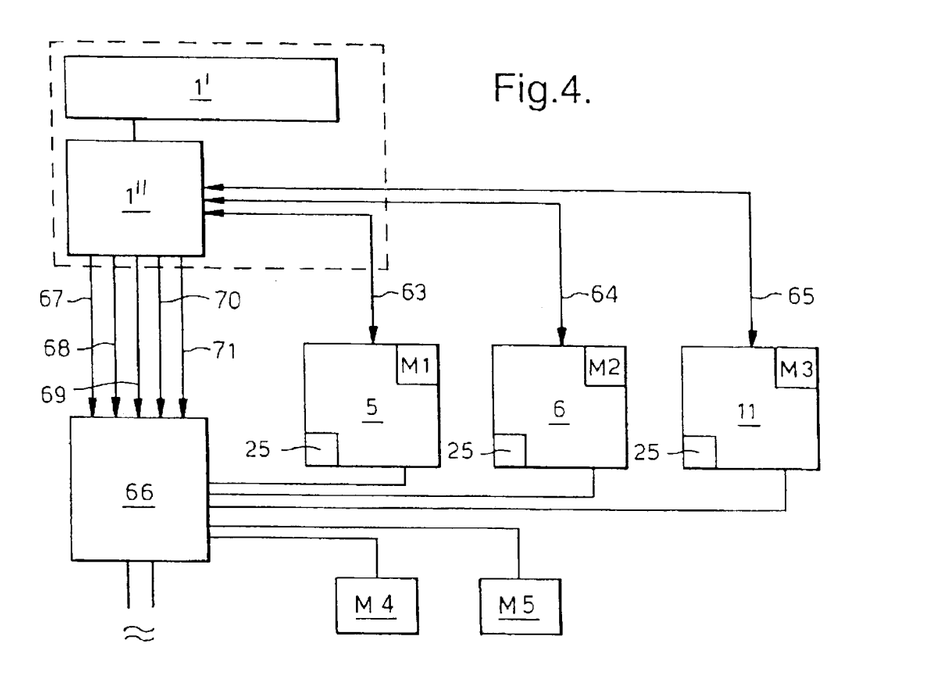
FIG. 4 is a block diagram of the electric/electronic structure of the system as shown in FIGS. 1–3.
Figure 5:
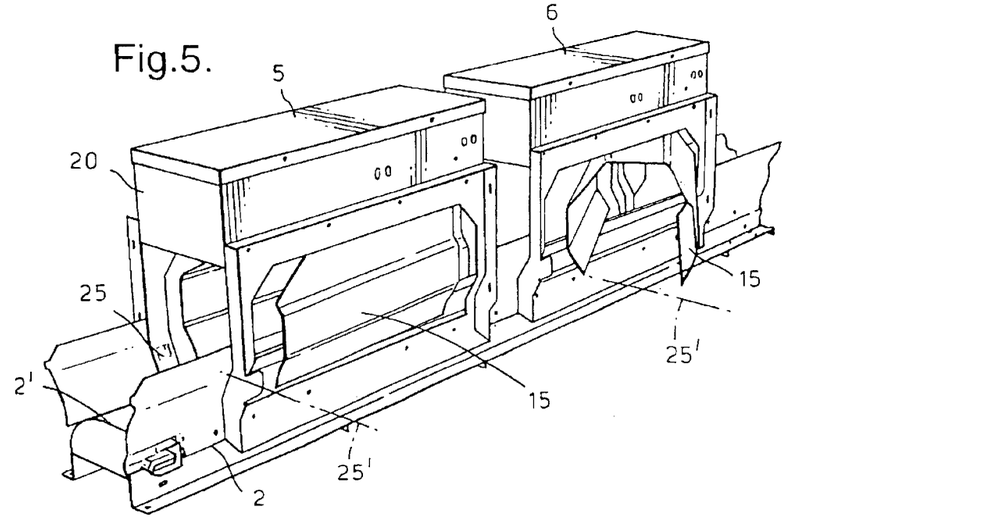
FIG. 5 is a perspective view of a sorting apparatus that is a component of the system according to the invention.

The invention will now be further explained with reference to FIG. 4. The article-recognition station 1 has a detector, a signal processor 1' and a control unit 1" which provides signals indicating sorting direction sent from the article-recognition station.

The control unit 1" is connected to each of the sorting apparatuses 5, 6 and 11 via respective control lines 63, 64, 65. The detectors 25 in connection with each sorting apparatuses 5, 6, 11 alert the control unit 1" when an article first breaks the detection zone 25' and also when the article leaves the detection zone 25'. A power supply unit 66 supplies each of the sorting apparatuses 5, 6, 11 and associated equipment with electric power to drive the motors M1, M2 and M3. The power supply 66 receives its power input from, for example, the ordinary electricity network, although other solutions are of course possible.

Via connections 67–69, the control unit 1" can control the current supply 66 to respective motors M1, M2 and M3 in the sorting apparatuses 5, 6 and 11.

Furthermore, the control unit 1" can, via connections 70, 71 to the power supply, control motors M4 and M5 which are intended to drive respectively the lifting apparatus shown in FIGS. 10 and 11 and the conveyor 2, 3 shown in FIG. 13. If for example, blockages should unexpectedly occur in connection with the sorting apparatuses 5, 6 or 11, a message can be sent via the connections 63–65 to the control unit 1", whereby the motor M4 and/or the motor M5 can be stopped until the fault that has occurred has been rectified.

Although the drawings show typical exemplary embodiments of the invention, it will be understood that what is taught and described in connection with the attached drawings should not be seen as defining the limits of the invention, as modifications within the scope of the invention can easily be envisaged.

What is claimed is:

1. An apparatus for sorting articles that are conveyed on a conveyor belt, where the apparatus includes at least one actuator-controlled channel-formed gate pivotable about a vertical axis at an end thereof, said gate arranged to be able to guide an article sideways relative to the longitudinal direction of the conveyor belt by a rotational movement across the conveyor belt, and which in a neutral position is arranged to allow the article to move past unaffected by the gate, and where the actuation of the gate is controlled on the basis of a signal indicating the sorting direction sent from an article-recognition station, characterised in that the gate has two channel side walls separated by a distance approximately equal to the width of the conveyor belt and where the side walls at the top are connected via at least one connecting piece;

that the actuator is placed at a level above the gate and is via its vertical shaft connected to the gate connecting piece at the downstream end of the gate; and that the actuator is designed, based on said signal, to:
either maintain the gate in a neutral position so that articles can pass unobstructed through the channel with its walls parallel to the direction of transport;
or turn the gate towards one side or the other of the conveyor belt, so that the upstream end of the gate lies essentially beyond a longitudinal edge of the conveyor belt, and so that an article that is to be removed from the conveyor belt through said sideways guidance is movable along an outside face of one of the channel walls having its upstream end closest to said longitudinal edge.

2. An apparatus as disclosed in claim 1, characterised in that the gate upon turning back to its neutral position or into the opposite swivelled position causes the said channel wall to also simultaneously push the article away from the conveyor belt.

3. An apparatus as disclosed in claim 1 or 2, characterised in that at the upstream end of the gate there is located a detector that detects the passing of the article.

4. An apparatus as disclosed in claim 1 or 2, characterised in that the articles that are conveyed consist of beverage packaging lying in a horizontal position.

5. An apparatus as disclosed in claim 1 or 2, characterised in that the conveyor belt is designed to move continuously; that the articles have a separation on the conveyor belt that is a function of the time the gate takes to return to the neutral position after the article has passed the detector and the time it takes the gate to turn outwards.

6. An apparatus as disclosed in claim 1, characterised in that the actuator is a step motor.

7. An apparatus as disclosed in claim 1, characterised in that the actuator is solenoid-operated.

8. An apparatus as disclosed in claim 1, characterised in that the actuator is a DC motor with a gear.

9. An apparatus as disclosed in claim 1, characterised in that the detector is based on detection of light, ultrasound or the presence of metal.

10. An apparatus as disclosed in claim 4, characterised in that said beverage packaging are bottles.

11. An apparatus as disclosed in claim 4, characterised in that said beverage packaging are cans.

12. An apparatus as disclosed in claim 3, characterised in that the articles that are conveyed consist of beverage packaging lying in a horizontal position.

13. An apparatus as disclosed in claim 3, characterised in that the conveyor belt is designed to move continuously; that the articles have a separation on the conveyor belt that is a function of the time the gate takes to return to the neutral position after the article has passed the detector and the time it takes the gate to turn outwards.

14. An apparatus as disclosed in claim 4, characterised in that the conveyor belt is designed to move continuously; that the articles have a separation on the conveyor belt that is a function of the time the gate takes to return to the neutral position after the article has passed the detector and the time it takes the gate to turn outwards.

* * * * *